United States Patent
Klimczak et al.

(10) Patent No.: US 12,322,955 B2
(45) Date of Patent: Jun. 3, 2025

(54) HV SWITCH UNIT WITH SNUBBER ARRANGEMENTS

(71) Applicant: TRUMPF Huettinger Sp. z o. o., Zielonka (PL)

(72) Inventors: Andrzej Klimczak, Warsaw (PL); Michal Balcerak, Marki (PL); Andrzej Gieraltowski, Warsaw (PL)

(73) Assignee: TRUMPF HUETTINGER SP. Z O. O., Zielonka (PL)

( * ) Notice: Subject to any disclaimer, the term of this patent is extended or adjusted under 35 U.S.C. 154(b) by 262 days.

(21) Appl. No.: 18/163,305

(22) Filed: Feb. 2, 2023

(65) Prior Publication Data

US 2023/0170688 A1 Jun. 1, 2023

Related U.S. Application Data

(63) Continuation of application No. PCT/EP2021/071922, filed on Aug. 5, 2021.

(30) Foreign Application Priority Data

Aug. 6, 2020 (EP) .................................. 20461558

(51) Int. Cl.
*H02H 9/04* (2006.01)
*H02H 1/00* (2006.01)

(52) U.S. Cl.
CPC ............ *H02H 9/04* (2013.01); *H02H 1/0007* (2013.01)

(58) Field of Classification Search
CPC ..... H02H 9/04; H02H 1/0007; H02M 7/4833; H02M 1/0012; H02M 1/0029; H02M 1/348; H02M 1/088
See application file for complete search history.

(56) References Cited

U.S. PATENT DOCUMENTS

| | | | |
|---|---|---|---|
| 4,555,754 | A | 11/1985 | Hennevin |
| 4,670,667 | A | 6/1987 | Petit |

(Continued)

FOREIGN PATENT DOCUMENTS

| | | |
|---|---|---|
| CN | 203504399 U | 3/2014 |
| CN | 105356779 A | 2/2016 |

(Continued)

OTHER PUBLICATIONS

L.M. Redondo et al, "All Silicon Marx-bank Topology for High-voltage, High-frequency Rectangular Pulses," Annual IEEE Conference on Power Electronics Specialists (PESC), Jun. 2005, pp. 1170-1174, IEEE, Dresden, Germany.

(Continued)

*Primary Examiner* — Jared Fureman
*Assistant Examiner* — Nicolas Bellido
(74) *Attorney, Agent, or Firm* — LEYDIG, VOIT & MAYER, LTD.

(57) ABSTRACT

A method of balancing voltage distribution over a plurality of switches connected in series with each other in a high voltage (HV) switch is provided. A snubber arrangement is associated with each switch of the plurality of switches. The method includes, for a first snubber arrangement associated with a first switch of the plurality of switches, determining a first voltage across a first snubber energy storage component of the first snubber arrangement associated with the first switch. The method further includes, for a second snubber arrangement associated with a second switch of the plurality of switches, determining a second voltage across a second snubber energy storage component of the second snubber arrangement associated with the second switch. The method further includes comparing the first voltage and the second voltage and, based on the comparison, adjusting a first drive signal of at least the first switch based on the first voltage.

13 Claims, 3 Drawing Sheets

(56) References Cited

U.S. PATENT DOCUMENTS

| | | | |
|---|---|---|---|
| 5,286,360 | A | 2/1994 | Szczyrbowski et al. |
| 5,969,964 | A | 10/1999 | Mangtani |
| 6,096,174 | A | 8/2000 | Teschner et al. |
| 6,488,807 | B1 | 12/2002 | Collins et al. |
| 6,859,087 | B2 | 2/2005 | Galli et al. |
| 6,963,498 | B2 | 11/2005 | Nadd |
| 8,536,929 | B2 | 9/2013 | Bergmann |
| 8,962,488 | B2 | 2/2015 | Liao et al. |
| 10,347,500 | B1 | 7/2019 | Doh et al. |
| 11,296,592 | B2 | 4/2022 | Ishikura et al. |
| 2001/0017783 | A1 | 8/2001 | Bruckmann et al. |
| 2002/0004309 | A1 | 1/2002 | Collins et al. |
| 2004/0055881 | A1 | 3/2004 | Christie |
| 2004/0257845 | A1* | 12/2004 | Wu ............... H03K 17/107 363/132 |
| 2010/0248488 | A1 | 9/2010 | Agarwal et al. |
| 2012/0038677 | A1 | 2/2012 | Hiroi et al. |
| 2012/0242391 | A1* | 9/2012 | Fan ................ H03K 5/08 327/330 |
| 2013/0223104 | A1* | 8/2013 | Tian ............. H02M 3/33576 363/17 |
| 2015/0268486 | A1 | 9/2015 | Edler |
| 2016/0043546 | A1 | 2/2016 | Lendi |
| 2016/0203958 | A1 | 7/2016 | Arase et al. |
| 2018/0309369 | A1* | 10/2018 | Radic .............. H02M 3/33507 |
| 2018/0358213 | A1 | 12/2018 | Ruzic et al. |
| 2019/0088521 | A1 | 3/2019 | Chua et al. |
| 2019/0088522 | A1 | 3/2019 | Lindley et al. |
| 2019/0198298 | A1 | 6/2019 | Hirose et al. |
| 2020/0119650 | A1* | 4/2020 | Radic ............... H02M 1/08 |
| 2023/0170687 | A1* | 6/2023 | Klimczak ........ H02H 1/0007 361/56 |

FOREIGN PATENT DOCUMENTS

| | | |
|---|---|---|
| CN | 105406722 B | 10/2018 |
| DE | 19651811 A1 | 6/1998 |
| DE | 102012222606 A1 | 6/2014 |
| DE | 102013212099 A1 | 1/2015 |
| DE | 102016223314 A1 | 5/2018 |
| EP | 0553410 A1 | 8/1993 |
| EP | 2533411 A1 | 12/2012 |
| FR | 2547106 A1 | 12/1984 |
| JP | H06105536 A | 4/1994 |
| JP | H 06197522 A | 7/1994 |
| JP | H 0767320 A | 3/1995 |
| JP | 2003129234 A | 5/2003 |
| JP | 2010116578 A | 5/2010 |
| WO | WO 2005005684 A1 | 1/2005 |
| WO | WO 2008071732 A2 | 6/2008 |
| WO | WO 2010116578 A1 | 10/2010 |
| WO | WO 2016026790 A2 | 2/2016 |
| WO | WO 2019049158 A1 | 3/2019 |
| WO | WO 2019212592 A1 | 11/2019 |
| WO | WO 2020090768 A1 | 5/2020 |

OTHER PUBLICATIONS

Ahmed Abbas Elserougi et al; "Conceptual Study of a Bipolar Modular High-Voltage Pulse Generator with Sequential Charging," IEEE Transactions on Dielectrics and Electrical Insulation 23(6), Dec. 2016, pp. 1-8, IEEE, Piscataway, New Jersey, United States.

C. Gerster, "Fast high-power/high-voltage switch using series-connected IGBTs with active gate-controlled voltage-balancing," Proceedings of 1994 IEEE Applied Power Electronics Conference and Exposition—ASPEC'94, Feb. 1994, pp. 469-472, IEEE, Orlando, FL, USA.

D Gahan et al, "Ion energy distribution measurements in rf and pulsed dc plasma discharges," Plasma Sources Science and Technology, Apr. 2012, pp. 1-4, vol. 21, No. 4, IOP Publishing Ltd, Bristol, United Kingdom.

Y. H. Man et al, "Influence of plasma condition on carbon nanotube growth by rf-PECVD," Nano-Micro Letters, 2010, pp. 37-41, Springer Link, Berlin, Germany.

Hiren Canacsinh et al, "Isolated Autonomous Capacitive Power Supplies to Trigger Floating Semiconductors in a Marx Generator," 2007 IEEE International Symposium on Industrial Electronics, Jun. 2007, pp. 1-6, IEEE, Vigo, Spain.

J. Saiz, "Optimisation and integration of an active clamping circuit for IGBT series association," Conference Record of the 2001 IEEE Industry Applications Conference. 36th IAS Annual Meeting (Cat. No. 01CH37248), Sep. 2001, pp. 1046-1051, IEEE, Chicago, IL, USA.

Soonwook Hong et al, "Series connection of IGBT's with active voltage balancing," IEEE Transactions on Industry Applications, Aug. 1999, pp. 917-923, vol. 35, Issue 4, IEEE, Piscataway, New Jersey, United States.

Shiqi Ji et al,"Series-connected HV-IGBTs using active voltage control with status feedback circuit," 2014 IEEE Energy Conversion Congress and Exposition (ECCE), Sep. 2014, pp. 710-715, IEE, Pittsburgh, PA, USA.

The Van Nguyen et al, "Series connection of IGBT," 2010 Twenty-Fifth Annual IEEE Applied Power Electronics Conference and Exposition (APEC), Feb. 2010, pp. 2238-2244, IEEE, Palm Springs, CA, USA.

M.A. Huque et al, "Silicon-on-insulator-based high-voltage, high-temperature integrated circuit gate driver for silicon carbide-based power field effect transistors", IET Power Electronics, Nov. 2010, pp. 1001-1009, vol. 3, Issue 6, The Institution of Engineering and Technology, London, England.

* cited by examiner

HV SWITCH UNIT WITH SNUBBER ARRANGEMENTS

CROSS REFERENCE TO RELATED APPLICATIONS

This application is a continuation of International Application No. PCT/EP2021/071922 (WO 2022/029255 A1), filed on Aug. 5, 2021, and claims benefit to European Patent Application No. EP 20461558.7, filed on Aug. 6, 2020. The aforementioned applications are hereby incorporated by reference herein.

FIELD

Embodiments of the present invention relate to a method of balancing the voltage distribution over the switches connected in series in a high voltage (HV) switch, wherein a snubber arrangement is associated with each switch. Embodiments of the present invention also relate to an HV switch unit.

BACKGROUND

An HV switch is a switch which is made up a series connection of several semiconductor switches, and capable of switching voltages equal or above 500 V, in particular equal or above 1 kV. The series connection of semiconductor switches may be called a switch stack. All semiconductor switches connected in series and working as one single switch must go into the on and/or off-status simultaneously in order to balance the voltage distribution along the switch stack. Small timing deviations, related to signal propagation delay dispersion, may cause large voltage imbalance and lead to destruction of one or several semiconductor switches and thus the HV switch due to overvoltage or voltage-related stress.

The distribution of the voltage on the switches may also be unequal due to different voltages to ground on the bodies of the semiconductor switches and different capacitances between the switches to ground. Unequal voltage distribution can also cause an unequal power loss distribution. This can cause a cooling problem.

The significance of the problem increases with the length of the switch stack, i.e. the number of semiconductor switches, the switching frequency, and switching velocity.

SUMMARY

Embodiments of the present invention provide a method of balancing voltage distribution over a plurality of switches connected in series with each other in a high voltage (HV) switch. A snubber arrangement is associated with each switch of the plurality of switches. The method includes, for a first snubber arrangement associated with a first switch of the plurality of switches, determining a first voltage across a first snubber energy storage component of the first snubber arrangement associated with the first switch. The method further includes, for a second snubber arrangement associated with a second switch of the plurality of switches, determining a second voltage across a second snubber energy storage component of the second snubber arrangement associated with the second switch. The method further includes comparing the first voltage and the second voltage and, based on the comparison, adjusting a first drive signal of at least the first switch based on the first voltage.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
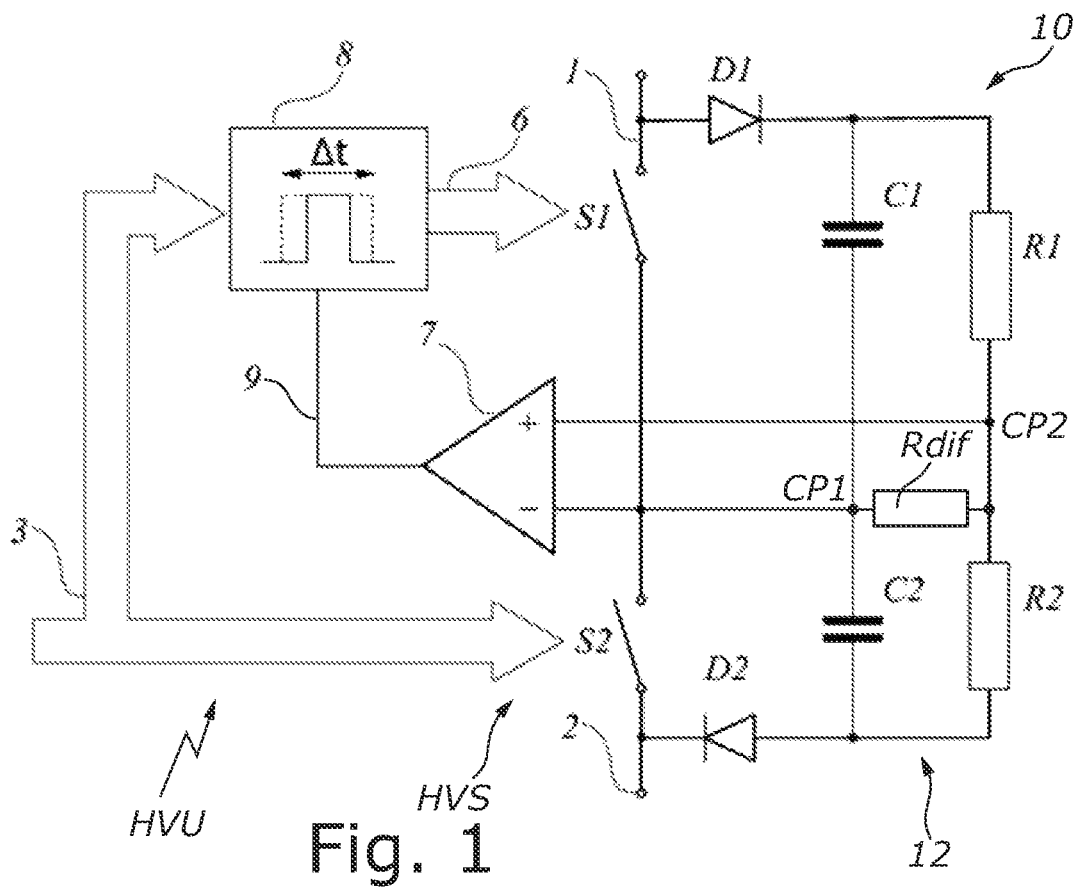
FIG. 1 shows a first embodiment of an HV switch unit comprising a comparing component.

Embodiments of the present invention provide a method of balancing the voltage distribution over the switches connected in series in an HV switch. A snubber arrangement is associated with each switch. The method includes the steps of:

a. determine a first quantity related to the snubber arrangement of a first switch, in particular a first voltage across a first snubber energy storage component associated with a first switch, b. determine a second quantity related to the snubber arrangement of a c. second switch, in particular a second voltage across a second snubber energy storage component associated with a second switch, d. compare the first and second quantities, in particular the first and second voltage, e. based on the comparison adjust the drive signal of at least the first switch based on the first quantity.

The drive signal of the first switch may be adjusted in a self-controlled manner. Adjustment in a self-controlled manner may include adjustment of the drive signal based on quantities of the HV switch unit without the use of a control. Hence, this term implies that an adjusted drive signal is not generated by a control or a drive signal generator.

The snubber arrangement can be used to determine for example a voltage as a first quantity. Based on the first quantity the control signal for controlling the first switch can be adjusted, thus adjusting the time of switch-on and/or switch-off, i.e. the switching-on and/or switching-off moment.

The drive signal may come from a digital control device, such as a microcontroller, programmable logic device, such as FPGA, or other digital logic circuit. The "adjusting the drive signal" may be done by a drive signal adjuster, which may be a separate electronic circuitry. In this way the drive signal itself could stay constant, i.e. without an individual adjustment. In this way the adjustment may be done very fast and without interference into the logical circuitry or program, which could be disadvantageously slow. In this way the drive signal may also be the same for all switches connected in series and the switching adjustment for one or several, in particular all individual switch(es), may be done by the drive signal adjuster(s). Hence, only one drive signal needs to be generated and there is no need for a control to generate and/or adjust the drive signals for several switches. There is no burden on the control for the generation of several drive signals.

Even voltage distribution among multiple semiconductor switches, which are connected in series to form an HV switch, can be achieved by changing a switching time of an individual switch. Thus, a voltage distribution along the switch stack during each OFF state of the HV switch can be achieved such that each individual switch-stack component does not suffer overvoltage or any excessive voltage-related stress.

Thanks to this method of shifting the control signal for semiconductor switches it is possible to influence the voltage distribution along the series connected semiconductor switches. This method can be applied for hard-switching devices (on which a voltage is present before switching-on or/and a current is present before switching-off).

The first and second quantities may be determined for adjacent switches. In this method snubber arrangements, in particular resistor-capacitor (RC)-snubbers or resistor-capacitor-diode (RCD)-snubbers, can be provided for each semiconductor switch. Instead of a diode also a different rectifying component may be used. The sum of the voltage of two contiguous snubber arrangements' snubber energy storage components, in particular capacitors, may be divided by a voltage divider, comprising for example resistors. In particular, the voltage may be divided by two. The resistors may be part of the snubber arrangements. By comparing the voltage of the middle of the snubber arrangements' capacitors with the voltage from the voltage divider the control signal may be shifted in time to reach the state, in which snubber capacitors of contiguous switches have the same voltage. This method can be applied to individually shift the drive signal of any number of serial connected semiconductor switches. With this method switching times of each semiconductor may be adjusted in a self-controlled manner to reach an equal voltage distribution for all series connected switches.

Adjusting the drive signal may include delaying or advancing the drive signal. This may include a pulse-width-modulation of the drive signal in order to obtain an adjusted drive signal.

A drive signal may be provided and one of the switches may be driven by the drive signal and the other switches may be driven by an adjusted drive signal formed by adjusting said drive signal. Thus, an equal voltage distribution along all switches can be achieved. The adjusted drive signals for the other switches may be different and individually adjusted for each switch. At the same time, only one drive signal may be generated. This keeps the logical drive signal generation easy.

The voltage across a snubber energy storage component associated with a first switch may be determined as first quantity and the voltage across a snubber energy storage component associated with a second switch may be determined as the second quantity. Hence, quantities associated with different snubber arrangements of different switches may be used to adjust the drive signal of one of the switches.

The drive signal of at least one switch may be adjusted based on a quantity related to a voltage limiter provided in the snubber arrangement of the at least one switch. For example, the current of a voltage limiter connected across the capacitor of a snubber arrangement may be determined. Alternatively, the voltage, which drives the voltage limiter, can be determined and the drive signal may be adjusted before the voltage limiter draws current. Use of a voltage limiter allows to reduce power dissipation of the snubber arrangement when the voltage is below the limit value and allows safe operation in burst mode.

If the voltage on a particular switch needs to be reduced, the switch-on time may be slightly advanced, and the switch-off time may be slightly delayed against the switching of the neighboring switches.

Embodiments of the present invention introduce small deviations of the switch-on and/or switch-off times of individual switches in the switch-stack making up the HV switch, based on signals available on the local potential level of each switch, in order to compensate propagation delays and minimize the voltage imbalance between the switches.

The control signal used to determine the time adjustment delays may be obtained by:
comparing the voltage across the particular switch's snubber capacitor with that on the neighboring switches or detecting the current of a voltage limiter connected across the snubber capacitor of that particular switch or measuring the voltage, which drives the voltage limiter and reacting to its value before the voltage limiter draws current.

If the voltage on a particular switch needs to be reduced, the switch-on time may be slightly advanced and/or the switch-off time may be slightly delayed against the switching of the neighboring switches.

Embodiments of the present invention provide an HV switch unit that comprises:
a. an HV switch comprising several semiconductor switches connected in series,
b. connected parallel to each semiconductor switch a snubber arrangement comprising at least one snubber energy storage component,
c. at least one drive signal adjuster to adjust the drive signal of at least one switch,
d. a feedback arrangement for supplying a quantity related to the snubber arrangement of the at least one switch to the drive signal adjuster.

The drive signal adjuster is configured to
e. determining a first quantity related to the snubber arrangement of a first switch, in particular a first voltage across a first snubber energy storage component associated with a first switch,
f. determining a second quantity related to the snubber arrangement of a second switch, in particular a second voltage across a second snubber energy storage component associated with a second switch,
g. comparing the first and second quantities, in particular the first and second voltage,
h. based on the comparison adjusting the drive signal of at least the first switch based on the first quantity.

By adjusting the drive signal even voltage distribution can be achieved. Thus, the individual switches can be protected from overvoltage and voltage stress. A fast HV switch capable of switching high voltages can thus be realized. Known solutions deal with the driver-dispersion-related voltage unbalance instead of the dispersion itself. According to embodiments of the present invention, the dispersion is compensated to achieve proper voltage distribution. The compensation works locally at the driver potential. There is no need for extra insulation of additional signals.

As a result, the HV switch unit is configured to switch the switches on and/or off simultaneously. This means that the switches go into the on and/or off-state simultaneously, i.e. the outputs of the switches change their state simultaneously.

The snubber energy storage components of the snubber arrangements of two adjacent switches may be connected in series at a connection point and the connection point may be connected to a comparing component. Thus, quantities related to two different semiconductor switches and/or their associated snubber arrangements can be used for adjusting the drive signal of one of the switches. The comparing component may be configured to determine which of its input signals or quantities is higher and how much it is higher. This is in contrast to a mere comparator which may only determine which of its input signals or quantities is higher.

Resistors of snubber arrangements of two adjacent switches may be connected in series at a second connection point and the second connection point may be connected to the comparing component. Thus, two voltages may be compared and based on the comparison the drive signal may be adjusted.

The comparing component may be integrated in the drive signal adjuster. Thus, the HV switch unit may be implemented with few components.

A voltage limiter may be provided in at least one of the snubber arrangements and a quantity related to the voltage limiter may be supplied to the drive signal adjuster of the switch associated with the at least one snubber arrangement. Use of a voltage limiter allows to reduce power dissipation of the snubber arrangement when the voltage is below the limit value and allows safe operation in burst mode.

All switches or all but one switch may be associated with a drive signal adjuster and the same drive signal may be supplied to the one switch and the drive signal adjusters associated with the other switches. The drive signal of the one switch can be considered to be a reference and the signals used to drive the other switches of the HV switch can be adjusted relative to that drive signal to ensure equal voltage distribution and simultaneous switching of the semiconductor switches.

A resistor may be connected between the first connection point and the comparing component.

Disclosed is a HV switch unit HVU comprising:
a. an HV switch HVS comprising several semiconductor switches S1, S2, Si, Sn connected in series,
b. connected parallel to each semiconductor switch S1, S2, Si, Sn a snubber arrangement 10, 10', 12, 12', 14, 14' comprising at least one snubber energy storage component C1, C1', C2, Ci, Ci', Cn, Cn',
c. at least one drive signal adjuster 8 configured to adjust the drive signal of at least one switch S1, S2, Si, Sn,
d. a feedback arrangement for supplying a quantity related to the snubber arrangement 10, 10', 12, 12', 14, 14' of the at least one switch S1, S2, Si, Sn to the drive signal adjuster 8.

All of the above-mentioned properties may also be properties of such a HV switch unit HVU.

Disclosed is further a method of balancing the voltage distribution over the switches S1, S2, Si, Sn connected in series in an HV switch HVS, wherein a snubber arrangement 10, 10', 12, 12', 14, 14' is associated with each switch S1, S2, Si, Sn, comprising the steps of:
a. Determining a first quantity related to the snubber arrangement 10, 10' of a first switch S1,
b. Adjusting the drive signal 6 of the first switch S1 based on the first quantity.

All of the above-mentioned properties may also be properties of such a method.

The method may further comprise:
c. determining a second quantity related to the snubber arrangement 12, 12', 14, 14' of a second switch S1, S2, Si, Sn,
d. comparing the first and second quantities,
e. based on the comparison adjusting the drive signal of at least the first switch S1.

FIG. 1 shows an HV switch unit HVU comprising an HV switch HVS comprising two semiconductor switches S1, S2 in a series connection. A first snubber arrangement 10 is associated with the first switch S1 and a second snubber arrangement 12 is associated with the second switch S2. Both snubber arrangements 10, 12 comprise a snubber energy storage component embodied as capacitor C1, C2 and a resistor R1, R2, as well as a rectifying component D1, D2 embodied as a diode. The resistors R1, R2 form a voltage divider. The connection point CP1 of the snubber energy storage components C1, C2 is connected to a comparing component 7 and the connection point CP2 of the resistors R1, R2 is also connected to the comparing component 7.

The resistors R1, R2 are not connected directly in parallel with the energy storage components C1, C2 of the respective snubber arrangement 10, 12 but are connected parallel as a strings, i.e. the series connection of the snubber energy storage components C1, C2 and the series connection of the resistors R1, R2 are connected in parallel. Thanks to this connection two voltages exist that can be used for further processing: the sum of the voltages on the snubber energy storage components C1, C2 divided by two by the resistors R1, R2 at connection point CP2 and a voltage which is a difference in charging voltage of the energy storage components C1, C2 at connection point CP1. The difference of those two voltages is determined by the comparing component 7 and supplied to a drive signal adjuster 8, which is supplied by a drive signal 3. The drive signal adjuster 8 acts as a pulse shifting device, which controls the switching time of switch S1. This is indicated by a Δt-arrow.

An optional resistor Rdif may be connected between CP1 and CP2 comparing component in order to equal voltages on energy storages components C1 and C2 when HV is switched on or off in long time (like in burst mode or after switching off the power supply)

In order to avoid unequal voltage distribution between the switches S1 and S2 the phase of the switching time of switch S1 is variable. Switch S2 is controlled directly (without any phase shifting circuit) using drive signal 3, i.e. an unadjusted drive signal. Switch S1 is controlled (indicated by arrow 6) by the drive signal adjuster 8, which is controlled by signal 9 created by the comparing component 7 embodied as an error amplifier. The comparing component 7 subtracts the voltage on the energy storage component C2 (at connection point CP1) of the second snubber arrangement 12 associated with the second switch S2 from one half of the voltage on both semiconductor switches S1, S2, i.e. the voltage at connection point CP2.

If the voltage at connection point CP1 is higher than the voltage at connection point CP2 it means that the voltage on second switch S2 is too high and it is necessary to decelerate the switching-on moments of switch S1 or/and accelerate the switching-off time of switch S1.

If the voltage at connection point CP1 is lower than the voltage at connection point CP2 it means that voltage on lower switch S2 is too low and it is necessary to accelerate the switching-on moments of switch S1 or/and decelerate the switching-off time of the switch S1.

Connection point CP1 is connected with a lower potential of switch S1, which could be an Emitter of an IGBT- or the Source of a MOS-FET transistor.

The drive signal adjuster 8 may be embodied as or comprise a digital signal processor (DSP).

The comparing component 7, the connection points CP1, CP2 and the connections to the drive signal adjuster 8 can be considered to be a feedback arrangement.

Figure 2:
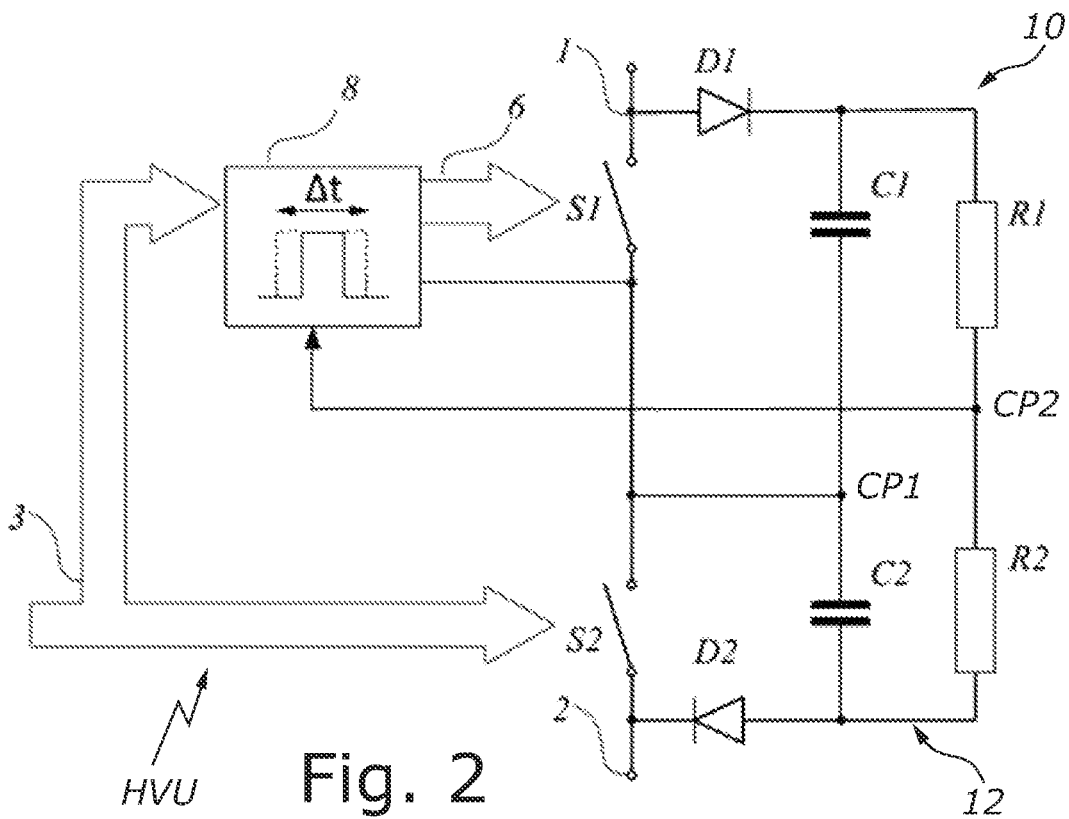
FIG. 2 shows a second embodiment of an HV switch unit without a separate comparing component.

The embodiment shown in FIG. 2 largely corresponds to the embodiment of FIG. 1. However, there is no separate comparing component present. A comparing component is implemented in drive signal adjuster 8. The voltage at CP2 is compared directly by drive signal adjuster 8 with the lower potential of switch S1, i.e. the voltage at connection point CP1, with is a ground potential of the drive signal adjuster 8.

Figure 3:
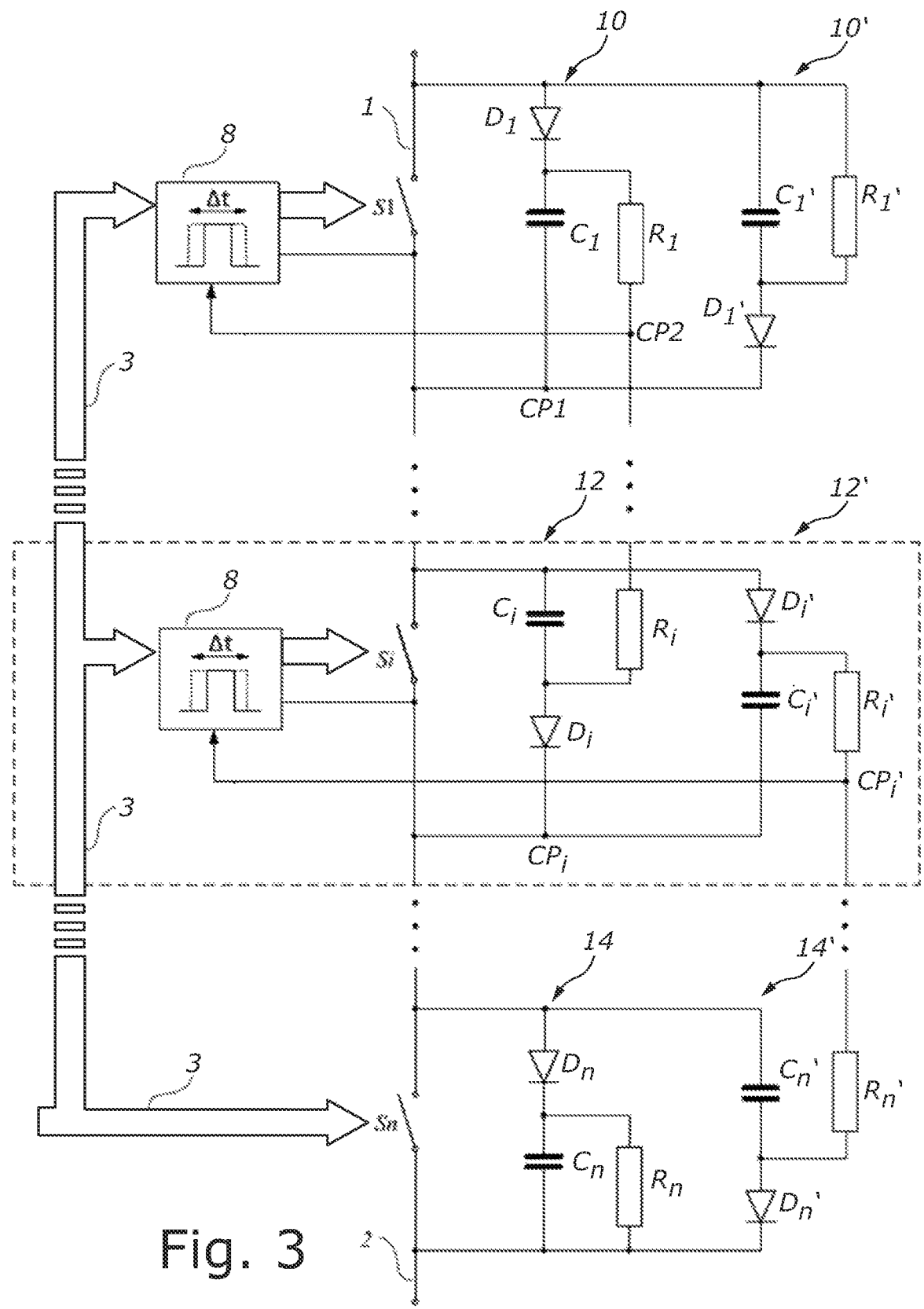
FIG. 3 shows a third embodiment of an HV switch unit comprising snubber arrangements and more than two switches connected in series.

FIG. 3 shows an HV switch unit HVU with more than two—in this case n—switches S1, Si, Sn connected in series, where n−1 switches S1, Si are controlled by drive signal adjusters 8 and one switch Sn is driven by a drive signal 3 directly. The drive signal 3 is also supplied to the drive signal adjusters 8 and accelerated or decelerated for each switch S1, Si based on the quantities determined from the snubber arrangements 10, 12, 14, 10' 12', 14', such that the voltage between terminals 1, 2 is distributed equally among the switches S1, Si, Sn.

If there are more than two semiconductor switches connected in series, it is helpful to connect two snubber arrangements 10, 10', 12, 12', 14, 14' to each switch S1, Si, Sn. The capacitance of each snubber energy storage component C1, C1', Ci, Ci', Cn, Cn' can be twice lower or the resistance of each resistor R1, R1', Ri, Ri', Rn, Rn' can be twice higher than for a single snubber arrangement associated with each switch S1, Si, Sn.

The resistors of a snubber arrangement associated with a particular switch are connected to a resistor of a snubber arrangement of an adjacent switch, in this case R1 is connected to Ri, Ri' is connected to Rn'. If there is no resistor of an adjacent snubber arrangement, the resistor is connected with its own capacitor, see R1' connected to C1' and Rn connected to Cn.

Switch Sn is controlled directly by the drive signal 3 while signals for switches S1, Si are shifted in time by drive signal adjusters 8 by comparing voltages on CP1 and CP2 as well as on CPi and CPi'.

Figure 4:
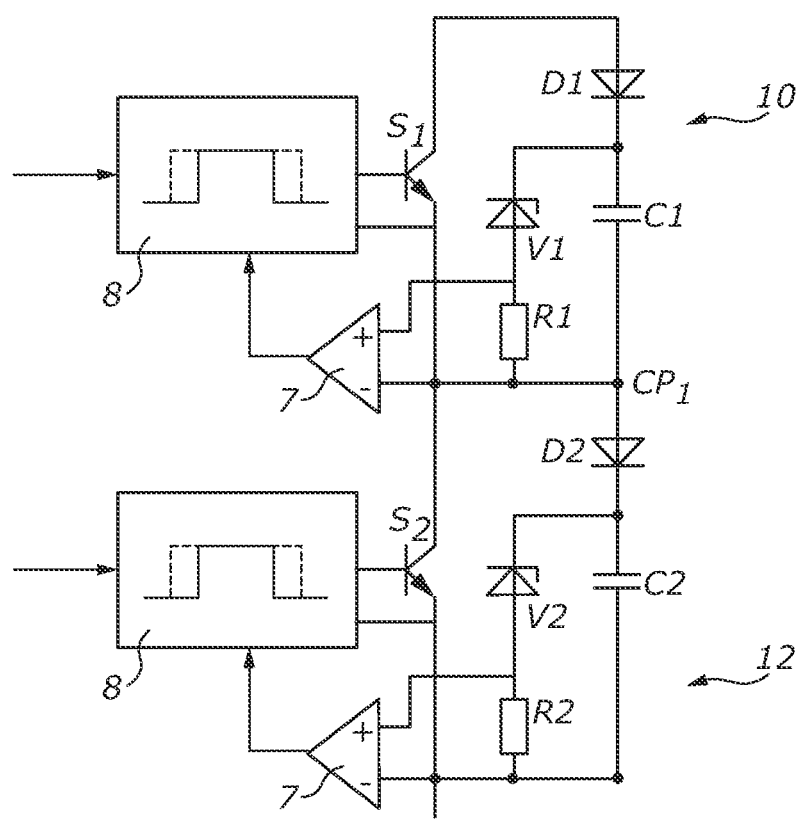
FIG. 4 shows a fourth embodiment of an HV switch unit comprising a voltage limiter.

In the embodiment of FIG. 4 the resistors R1, R2 are not connected in series. Rather, voltage limiters V1, V2 are provided. As soon as the voltage on C1 or C2 (being a first quantity related to the snubber arrangements 10, 12 respectively) exceeds the threshold voltage of the associated voltage limiter V1, V2, a positive voltage will appear on the associated resistor R1, R2, thus influencing the comparison result of comparing components 7, which lead to an adjustment of the drive signal by drive signal adjuster 8.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of balancing voltage distribution over a plurality of switches connected in series with each other in a high voltage (HV) switch, wherein a snubber arrangement is associated with each switch of the plurality of switches, the method comprising the steps of:
   a. for a first snubber arrangement associated with a first switch of the plurality of switches, determining a first voltage across a first snubber energy storage component of the first snubber arrangement associated with the first switch,
   b. for a second snubber arrangement associated with a second switch of the plurality of switches, determining a second voltage across a second snubber energy storage component of the second snubber arrangement associated with the second switch,
   c. comparing the first voltage and the second voltage with each other,
   d. based on the comparison, adjusting a first drive signal of at least the first switch based on the first voltage, wherein a drive signal is provided and one of the plurality of switches is driven by the drive signal, and at least the first switch is driven by the adjusted first drive signal.

2. The method according to claim 1, wherein the first drive signal of at least the first switch is adjusted in a self-controlled manner.

3. The method according to claim 1, wherein the first switch and the second switch are adjacent to each other.

4. The method according to claim 1, wherein adjusting the first drive signal includes delaying or accelerating the first drive signal.

5. The method according to claim 1, wherein adjusting the first drive signal comprises a pulse-width-modulation of the first drive signal.

6. The method according to claim 1, wherein the first drive signal of at least the first switch is adjusted based on voltage or a current related to a voltage limiter provided in the first snubber arrangement of at least the first switch.

7. A high voltage (HV) switch unit comprising:
   a. an HV switch comprising a plurality of semiconductor switches connected to each other in series,
   b. a respective snubber arrangement connected parallel to each respective semiconductor switch, the respective snubber arrangement comprising at least one snubber energy storage component,
   c. at least one drive signal adjuster configured to adjust a drive signal of at least one semiconductor switch,
   d. a feedback arrangement for supplying a voltage related to the respective snubber arrangement of the at least one semiconductor switch to the at least one drive signal adjuster, wherein the at least one drive signal adjuster is configured to e. determine a first voltage across a first snubber energy storage component of a first snubber arrangement associated with a first semiconductor switch,
f. determine a second voltage across a second snubber energy storage component of a second snubber arrangement associated with a second semiconductor switch,
g. compare the first voltage and the second voltage with each other,
h. based on the comparison, adjust the drive signal of at least the first semiconductor switch based on the first voltage.

8. The HV switch unit of claim 7, wherein the snubber energy storage components of the snubber arrangements of two adjacent switches are connected in series at a connection point, and the connection point is connected to a comparing component.

9. The HV switch unit of claim 8, further comprising a plurality of resistors, each respective resistor associated with a respective snubber arrangement, wherein resistors associated with snubber arrangements of two adjacent semiconductor switches are connected to each other in series at a second connection point, and the second connection point is connected to the comparing component.

10. The HV switch according to claim 8, wherein the comparing component is integrated in the at least one drive signal adjuster.

11. The HV switch according to claim 7, wherein at least one snubber arrangement comprises a voltage limiter, and a voltage or a current related to the voltage limiter is supplied to the drive signal adjuster of the semiconductor switch associated with the at least one snubber arrangement.

12. The HV switch according to claim 7, wherein all but one semiconductor switch are associated with the drive signal adjuster and the same drive signal is supplied to the one semiconductor switch and the drive signal adjusters.

13. The HV switch according to claim 7, further comprising a resistor connected between the first connection point and the comparing component.

* * * * *